United States Patent [19]

O'Dell

[11] 4,063,618
[45] Dec. 20, 1977

[54] GREASE GUN AND PRESSURE RELIEF VALVE THEREFOR

[75] Inventor: David L. O'Dell, Mishawaka, Ind.

[73] Assignee: Wheelabrator-Frye, Inc., Mishawaka, Ind.

[21] Appl. No.: 749,688

[22] Filed: Dec. 13, 1976

[51] Int. Cl.² ............................................. F16N 3/12
[52] U.S. Cl. ............................... 184/105 A; 222/397; 222/507; 251/340
[58] Field of Search .......... 184/105 R, 105 A, 105 B, 184/105 C, 28; 222/397, 318, 507; 251/340; 137/609, 612.1; 141/383, 382

[56] References Cited

U.S. PATENT DOCUMENTS

| 1,628,733 | 5/1927 | Morris | 251/340 X |
| 2,520,398 | 8/1950 | Hanks | 222/397 X |
| 2,615,598 | 10/1952 | Watkins et al. | 222/397 |
| 2,715,512 | 8/1955 | Miller et al. | 251/340 X |
| 3,788,427 | 1/1974 | Fox et al. | 184/105 C |

Primary Examiner—David H. Brown
Attorney, Agent, or Firm—Wood, Herron & Evans

[57] ABSTRACT

A flow control handle for supplying lubricant to a grease fitting. The handle includes a flow control valve interiorly thereof, a handle extension and a manual trigger for controlling the flow control valve. A pressure relief valve is operable to relieve high pressure grease in the handle extension. This valve is automatically closed and is opened by movement of the trigger in a direction opposite to that required to open the flow control valve whereby high pressure grease cannot enter the extension when the relief valve is open.

7 Claims, 3 Drawing Figures

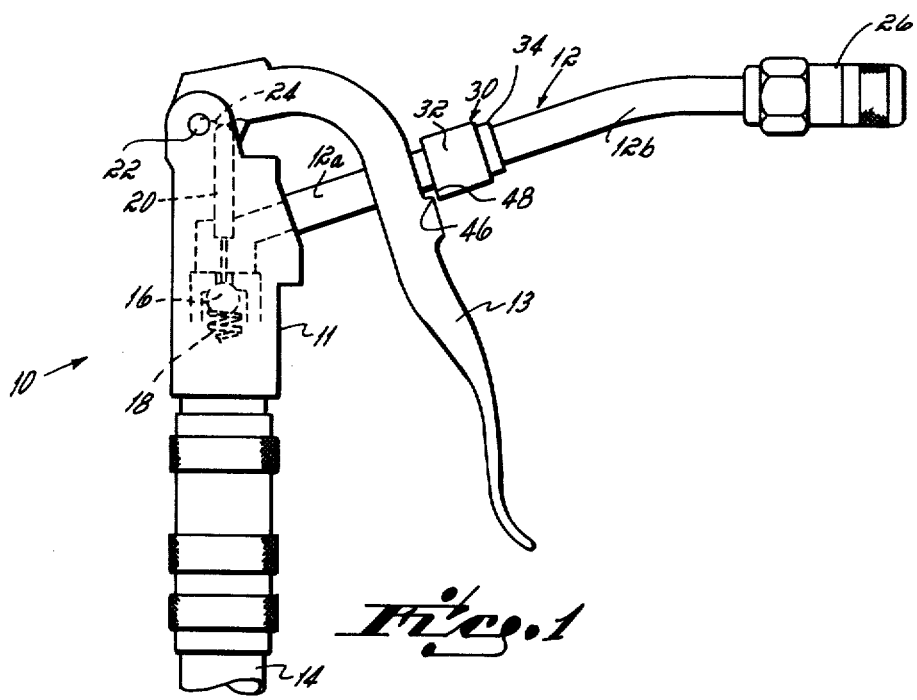
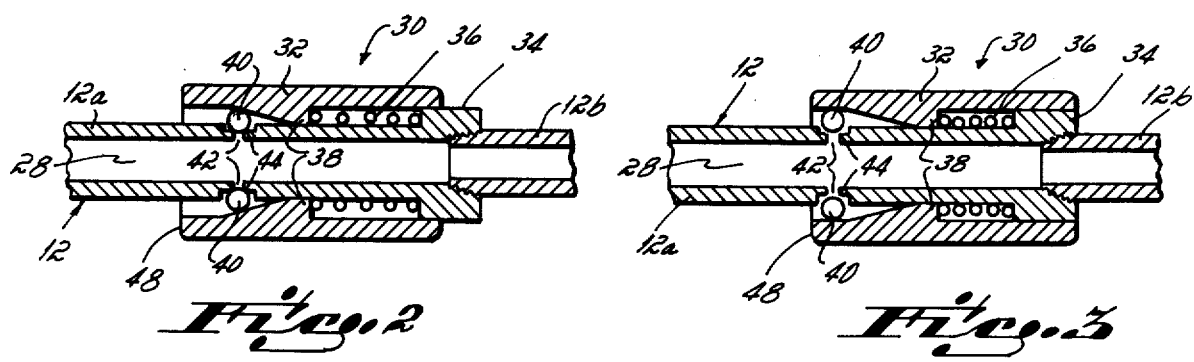

GREASE GUN AND PRESSURE RELIEF VALVE THEREFOR

BACKGROUND OF THE INVENTION

This invention relates to grease guns and particularly to a pressure relief valve for high pressure grease guns. More particularly, this invention relates to a pressure relief valve for use with high pressure grease guns of the type having a coupling secured to the outlet end of the gun which prevents grease from being ejected from the gun except when the coupling is properly located over a grease fitting.

Grease guns of the type with which the invention of this application is utilized are conventionally used in automobile service stations to grease bearings of motor vehicles. The gun is in reality a manually operated control handle for controlling a valve which in turn controls the flow of grease through the handle. When the valve of the gun or control handle is manually opened, it connects the outlet end of the gun to a high pressure grease pump. The pump is usually operable to supply grease to the gun at a pressure of approximately 7,000 pounds per square inch depending upon the resistance encountered by the grease in the bearing to which the grease is supplied. The greater the resistance, the higher the pressure of the grease ejected from the gun.

In addition to lubricant flow control handles of the type just described, there are also so-called "booster" control handles or guns for lubricating motor vehicles. Booster control handles are used for supplying grease at still higher pressures to vehicle bearings. A conventional booster control is operable to boost the ratio of grease pressure from the inlet to the outlet by a two-to-one ratio, i.e., from 7,000 to 14,000 p.s.i. Generally, booster control handles or guns are used to grease bearings of trucks or motor vehicles which are heavily loaded.

Irrespective of the type of gun or control handle which is employed for greasing or lubricating motor vehicles, some form of coupling unit is required by the gun and the grease fitting of the vehicle to interconnect the gun to the fitting. One type of coupling is a "fail-safe" coupling described in U.S. Pat. No. 3,788,427, assigned to the assignee of this invention, wherein the coupling has a valve contained internally of it which prevents grease from being ejected from the gun except when the coupling is properly located over a grease fitting. The coupling disclosed in the aforementioned patent eliminates the possibility of a mechanic either deliberately or inadvertently injecting himself with grease discharged through the grease gun and connected coupling.

Very nearly all high pressure grease guns contain a pressure relief valve to enable the gun to be removed or disconnected from "frozen" or "no flow" grease fittings. The necessity for this relief valve stems from the fact that most grease gun couplings include a piston or collect for clamping onto a grease fitting. If the fitting is frozen so that there is no flow through it, the collet becomes clamped onto the fitting by the grease pressure generally on the order of 7,000 pounds per square inch or more acting on the collet. The coupling can then only be removed by relieving the grease pressure behind the piston, and this is generally accomplished by opening the pressure relief valve. In couplings of the fail-safe type, it is possible for an operator to activate the gun and inadvertently fill the extension tube and coupling with high pressure grease. Because grease cannot be ejected through the coupling unless it is secured over a grease fitting, high pressure grease behind the piston prevents any rearward movement of the piston and thereby precludes the coupling from subsequently being attached to a fitting. Alternatively, if the coupling is properly located over a fitting but the bearing being lubricated by the fitting is frozen so that there is no throughput of grease, the grease pressure behind the piston may prevent the collet from being removed from the fitting.

In any of the situations just described, the pressure of the grease in the extension tube must be relieved. To that end, a relief valve is located in the extension tube. If this relief valve is opened to too great an extent or if the gun is equipped with a fail-safe coupling unit and the gun is activated while the coupling valve is closed and the relief valve open, high pressure grease is ejected through the relief valve and a dangerous condition obtains.

It has therefore been an object of this invention to eliminate or minimize the possibility of a mechanic deliberately or inadvertently permitting high pressure grease to be ejected through the relief valve. That is, it has been an objective of this invention to eliminate or minimize the possibility of grease being discharged through the grease gun flow control handle when the relief valve is open. To this end, the improved grease gun or control handle of this invention includes a relief valve which is opened by the manual control handle but which cannot be opened except by movement of the control handle in a direction opposite that required to open the flow control valve to actuate the grease gun. Consequently, the gun cannot be actuated when the relief valve is open and thus the gun is fail-safe and high pressure grease cannot be either deliberately or inadvertently ejected through the relief valve.

SUMMARY OF THE INVENTION

These and other objects of the invention are accomplished by providing a lubricant flow control handle including a handle body connected to a high pressure hose and having a flow control valve located interiorly thereof operable to permit the flow of grease through the handle on movement of a manually operable trigger in a direction towards the handle body. The flow control handle includes an extension connected to the end of the body opposite the hose connection and a pressure relief valve in the extension. The pressure relief valve is likewise actuated by the manual trigger, but only when the trigger is moved in a direction opposite that for actuating the flow control valve, e.g., in the direction away from the handle body.

In a preferred form of the invention, the pressure relief valve comprises a sleeve about the handle extension which is spring biased to a normal closed position. The trigger includes a cam surface which is operable to engage the sleeve and slide it axially up the handle extension to release a ball valve permitting pressure relief of the grease in the handle extension. Movement of the trigger to engage the sleeve and open the relief valve is in a direction opposite that required to open the flow control valve. Consequently, although the handle actuates both the flow control valve and the pressure relief valve, it cannot do so at the same time.

Other objects and advantages of this invention will be apparent from the following detailed description of the invention.

BRIEF DESCRIPTION OF THE DRAWINGS

FIG. 1 is a side elevation view of a grease gun control handle upon which there is mounted a coupling and a pressure relief valve.

FIG. 2 is a cross-sectional view of the pressure relief valve showing the valve in its closed position.

FIG. 3 is a cross-sectional view through the pressure relief valve showing the valve in its open position.

DETAILED DESCRIPTION OF THE INVENTION

Referring first to FIG. 1, the high pressure grease gun 10 includes a control handle 11 and a handle extension tube 12. The handle 11 has a manual trigger 13 operated control valve for controlling the flow of grease from a high pressure hose 14 to and through the extension tube 12. The hose 14 is conventionally a double wire braid hose which interconnects the handle 11 to a source of grease or hydraulic lubricant through a high pressure pump (not shown). Conventionally, the pump is an air operated reciprocating piston pump which is operated by approximately 150 pounds air pressure and is operable to discharge grease or a lubricant at a pressure on the order of 7,000 p.s.i.

The valve mechanism contained within the handle 11 for controlling the flow of lubricant through the gun or handle comprises a ball 16 type valve which is normallly urged by a spring 18 to a closed position. To open the valve and permit the throughput of high pressure grease from the hose 14 the trigger 13 actuates a valve plunger 20 which is slidably mounted above the ball 16 in the body of the handle 11. The trigger is pivotally mounted on the top of the handle, as indicated at 22, and has a first cam surface 24 engageable with the top of the plunger 20 so that movement of the trigger 13 from the position illustrated in FIG. 1 toward the body of the handle 11 (i.e., squeezing of the trigger) causes the cam surface 24 to engage the plunger 20 and move the plunger downwardly thereby opening the ball valve 16. Upon release of the handle, the valve is automatically closed by the spring 18.

At the opposite end of the extension tube is a coupling 26 which is operable to be secured to hydraulic grease fittings. A bore 28 (FIGS. 2 and 3) extends axially through the extension tube 12 and through the coupling 26 whereby grease can be delivered from the handle body 11 to the grease fitting. A suitable coupling is that described in the aforementioned U.S. Pat. No. 3,788,427. Valve means 30 for relieving grease pressure in the handle extension 12 is located in the extension tube 12 between the trigger 13 and the coupling 26.

In a preferred form, the pressure relief valve means 30 includes a sleeve 32 surrounding the extension tube 12. The extension tube 12 includes a first member 12a attached at one end to the handle body 11 and having an enlarged outer diameter at the other end 34. A second member 12b in internally threaded into the enlarged end 34. The sleeve 32 is axially slidable on the tube 12 and is biased by means of a compression spring 36 disposed internally of the sleeve 32 between end 34 and an annular flange 38 to a normal valve closed position, as illustrated in FIG. 2. In this position, the sleeve 32 engages one or more ball 40 valves thereby closing openings 42 which communicate through the wall of the extension tube 12 with the bore 28. The balls 40 in valve seats 44 such that when the sleeve 32 is moved axially the balls 40 move off their seats 44 under the pressure of the grease in the bore 28 permitting pressure relief through the openings 42, as illustrated in FIG. 3. On return of the sleeve 32 to the valve closed portion, the balls 40 are forced back on their seats to close off the openings 42.

In operation, the coupling 26 is forced by axial pressure over the end of a hydraulic grease fitting (not shown) until the coupling snaps onto the neck section of the fitting. The valve 16 contained within the control handle 11 is opened by movement of the trigger 13 towards the handle 11. At that time, high pressure lubricant or grease flows from the hose 14 through the handle 11, extension tube 12, and coupling 26 and into the fitting. So long as the trigger 13 is pulled rearwardly, high pressure grease continues to flow through the gun. When the trigger is released, valve 16 closes cutting off the flow of grease.

If for any reason the gun becomes frozen by high pressure grease in the extension tube 12, the pressure can be relieved by opening the pressure relief valve 30. The valve 30 is opened by means of the trigger 13 which includes a second cam surface 46 operable to engage the end 48 of the sleeve 32 when the trigger 13 is moved away from the handle body 11, i.e., in a direction opposite to that required to open the flow control valve 16. On engagement of the cam surface 46 with the sleeve end 48 and on continued movement of the trigger 13 away from the handle body 11, the spring 36 bias is overcome and the sleeve is moved up the handle extension 12 (in FIG. 3 shown as movement to the right). Since the internal sleeve portion surrounding the ball valves 40 slopes radially outwardly, movement of the sleeve up the handle permits the balls 40 to be lifted off the seats 44 under the pressure of the grease in the bore 28 thereby permitting pressure relief through the openings 42. It may be seen that the sloped internal surface of the sleeve results in a gradual opening of the valves thus permitting safe gradual relief of internal pressure. Spring 36 limits the axial movement of the sleeve 32 and thus the maximum degree of opening of the valve.

It is to be noted that when the trigger 13 is moved to actuate the pressure relief valve 30, the trigger 13 pivots counterclockwise about its mounting 22 and first cam surface 24 is lifted off the plunger 20. As a result, the valve 16 in the handle body 11 cannot be opened while the pressure relief valve is actuated.

When the grease pressure has been relieved, the pressure relief valve 30 automatically closes on release of the trigger 13. Spring 36 which had been compressed on opening of the valve now expands to force the sleeve down the extension whereby the inclined internal surface of the sleeve engages the balls 40 forcing them to seat over the openings 42 thereby closing those openings. The flow control valve 16 may now again be opened by the trigger 13 to permit flow of grease through the gun. Again, however, relief valve 30 closes automatically and when the valve 16 is opened, the trigger 13 is out of position and cannot actuate the relief valve 30.

The primary advantage of the pressure relief valve described hereinabove resides in the inability of a mechanic to discharge grease through the pressure relief valve either intentionally or inadvertently. Consequently, the control handle is much safer in the hands of an unskilled operator than it would be in the absence of the valve 30 described hereinabove.

Although the invention has been described in terms of a certain preferred embodiment, persons skilled in the art to which this invention pertains will readily appreciate modifications and changes which may be made without departing from the spirit of the invention. Therefore, I do not intend to be limited except by the scope of the appended claims.

Thus having described the invention, what is claimed is:

1. A lubricant flow control handle for supplying grease to a grease fitting, said handle comprising,
    a handle body adapted to be connected at one end to a high pressure, grease containing hose,
    a handle extension connected at one end to the opposite end of said body,
    a valve containing coupling secured to the outlet end of said handle extension, said valve containing coupling being operable to prevent grease from being ejected from the handle extension except when said coupling is properly located over a grease fitting,
    a flow control valve located interiorly of said body and operable to control the flow of grease through said body and into said extension,
    pressure relief valve means operable to relieve high pressure grease entrapped in said extension, between said flow control valve and said valve containing coupling when both said flow control valve and said valve containing coupling are in a closed condition, and
    a manually operable trigger pivotally mounted upon said body, said trigger being operable on movement in a first direction from a neutral centered position to open said control valve and on movement from said neutral centered position in a direction opposite said first direction to open said pressure relief valve means, said trigger being normally maintained by spring pressure in said neutral centered position in which both said control valve and said pressure relief valve are closed.

2. The flow control valve of claim 1 in which said first direction is toward said handle body and said second direction is away from said handle body.

3. The flow control valve of claim 1 in which said trigger includes cam means operable to engage said pressure relief valve means on movement of said trigger in said opposite direction to open said pressure relief valve means.

4. The flow control handle of claim 1 in which said pressure relief valve means is biased to a normal closed position.

5. The flow control handle of claim 4 in which said pressure relief valve means is biased by means of a spring.

6. The flow control valve of claim 1 in which said pressure relief valve means comprises at least one opening communicating with the path of flow of grease through said extension, a ball adapted to seat on said opening to close said opening, an axially slidable sleeve on said extension operable to seat said ball on said opening to close said pressure relief valve means, and spring means biasing said sleeve to a normal valve closed position.

7. The flow control valve of claim 6 in which said sleeve is slidable on said extension away from said handle body by movement of said trigger in said second direction to release said ball thereby opening said pressure relief valve means.

* * * * *

UNITED STATES PATENT AND TRADEMARK OFFICE
CERTIFICATE OF CORRECTION

PATENT NO. : 4,063,618
DATED : December 20, 1977
INVENTOR(S) : David L. O'Dell

It is certified that error appears in the above—identified patent and that said Letters Patent are hereby corrected as shown below:

Column 1, line 59 "collect" should be -- collet --

Column 3, line 66 after "40" insert -- seat --

Signed and Sealed this

Twenty-third Day of May 1978

[SEAL]

Attest:

RUTH C. MASON
Attesting Officer

LUTRELLE F. PARKER
Acting Commissioner of Patents and Trademarks